United States Patent [19]
Lee

[11] Patent Number: 5,517,513
[45] Date of Patent: May 14, 1996

[54] SYNC INTERPOLATIVE CIRCUIT AND SYNC STATE DETECTING CIRCUIT OF A DISC REPRODUCING APPARATUS

[75] Inventor: Cheon-seong Lee, Suwon, Rep. of Korea

[73] Assignee: Samsung Electronics Co., Ltd., Kyungki, Rep. of Korea

[21] Appl. No.: 311,855

[22] Filed: Sep. 26, 1994

[30]     Foreign Application Priority Data

Sep. 24, 1993 [KR]    Rep. of Korea ............... 93-19587

[51] Int. Cl.⁶ ............................................. G06F 11/00
[52] U.S. Cl. ............................................. 371/47.1
[58] Field of Search ............................. 371/47.1, 42, 46, 371/57.2, 61; 375/108, 116, 119, 111, 114; 370/100.1, 106; 395/575

[56]            References Cited

U.S. PATENT DOCUMENTS 4,453,260  6/1984  Inagawa et al. ................ 375/116
4,617,594  10/1986  Katagiri et al. ................ 358/150
5,016,159  5/1991  Maruyama ..................... 364/200
5,161,171  11/1992  Suzuki et al. .................. 375/108
5,406,569  4/1995  Isozaki ........................... 371/42

*Primary Examiner*—Robert W. Beausoliel, Jr.
*Assistant Examiner*—Phung My Chung
*Attorney, Agent, or Firm*—Sughrue, Mion, Zinn, Macpeak & Seas

[57]            ABSTRACT

A sync interpolative circuit and sync state detecting circuit for use in a disc reproducing apparatus, which reproduces data by generating an interpolative sync signal even when a sync pattern of reproduced data is changed or no sync signal exists. The sync interpolative circuit generates the interpolative sync signal for accurately reproducing desired data, and the sync state detecting circuit informs a controlling portion of a state of the sync signal detected from the disc to facilitate data processing in the sector unit, thereby providing for more accurate reproduction of data regardless of errors in the sync signal.

18 Claims, 7 Drawing Sheets

FIG. 1A INPUT DATA | 00 | FF | FF | FF | FF | FF | FF | FF | FF | FF | FF | FF | 00 | 2340 BYTE

FIG. 1B CK

FIG. 1C SYNCDET

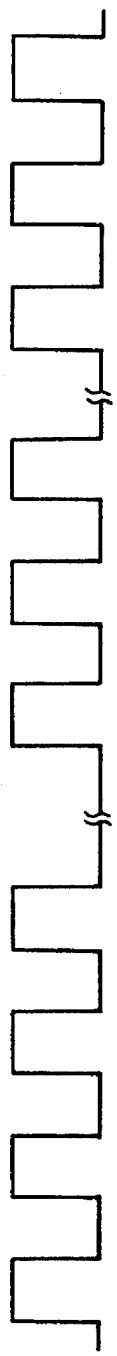
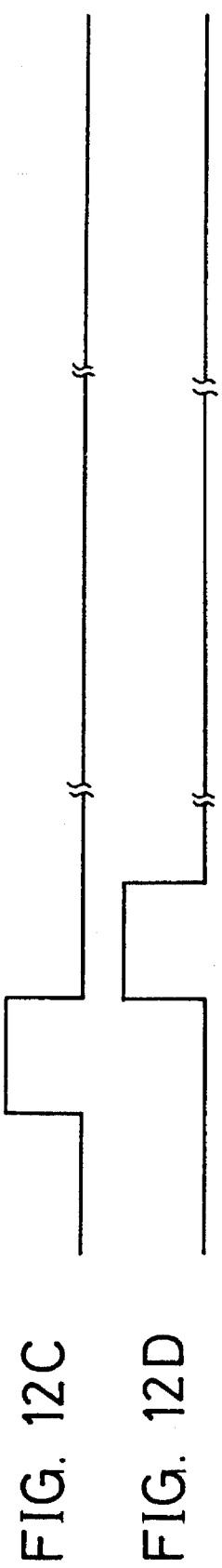
FIG. 12A
FIG. 12B
FIG. 12C
FIG. 12D
FIG. 12E
FIG. 12F
FIG. 12G
FIG. 12H

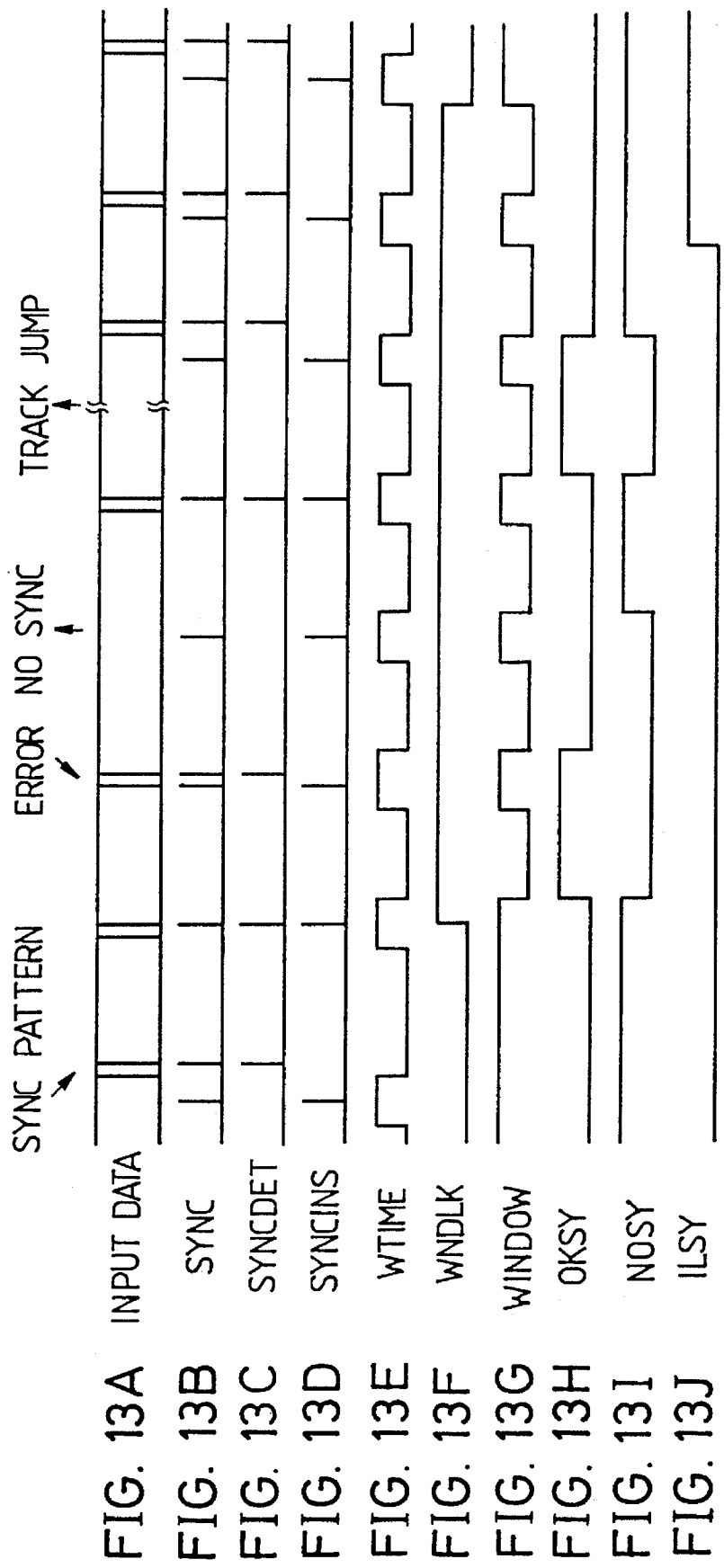

SYNC INTERPOLATIVE CIRCUIT AND SYNC STATE DETECTING CIRCUIT OF A DISC REPRODUCING APPARATUS

BACKGROUND OF THE INVENTION

The present invention relates to a sync signal generating apparatus for processing data stored in a disc sector unit, and more particularly to a system capable of detecting a sync signal and generating detected sync signal state information even though a sync pattern may not be present or there are disc sectors having damaged sync patterns.

Generally, data stored in a CD-ROM, CD-I, minidisc, and the like is stored in sector units of the disc. Such products scramble data to be stored in a sector unit in order to record it on a disc, and descramble the data read from the disc sector unit in order to reproduce the data. Accordingly, the disc reproducing apparatus necessarily must, for each sector, read out a sync pattern in order to reproduce the data stored on the disc.

FIG. 1A shows data with respect to a sector, FIG. 1B shows a clock signal utilized in processing the data, and FIG. 1C shows a detected sync signal obtained from the data, respectively. The sector illustrated in FIG. 1A consists of 2352 bytes, in which a sync pattern of 12 bytes is located at the beginning of the sector. When sync detection with respect to the sector is carried out, a detected sync signal SYNCDET is generated as illustrated in FIG. 1C.

However, conventional systems use only a sync detecting circuit for detecting the sync pattern of the reproduced data. Therefore, when the sync pattern is changed due to an error in the interim, or when no sync signal exists within the data read from the disc, such as when a track jump occurs, etc., these errors, which obstruct the reproduction, cannot be discriminated so that quick action can be taken by a controlling portion. Also, if the sync pattern is either changed or not detected, the sector interval of a sector undergoing descrambling is changed which impedes accurate reproduction of the data desired by a user.

A system capable of restoring the data from the disc sector regardless of whether a sync signal is missing or is damaged, is disclosed in European Patent Publication No. EP 549,151 A2 laid open on Jun. 30, 1993. Here, a selected sector is searched out in order to detect detecting a sync pattern that designates an arranged position of sector data. When such a sync pattern is not detected, a sync signal is detected by means of a window during a period corresponding to a sector data field. Then, when no sync is detected even after the period has elapsed, a sync find-fault signal is generated. In the case of failing in find the sync pattern, a pseudo-sync signal is generated by data restoration, and the window size is varied while moving a data block, thereby again detecting the sync signal.

SUMMARY OF THE INVENTION

The present invention is devised to solve the above-described problems. Accordingly, it is an object of the present invention to provide a sync interpolative circuit for a disc reproducing apparatus capable of reproducing data desired by a user, by generating an interpolative sync signal when a sync pattern reproduced from a disc is changed due to an error or that is not detected.

It is another object of the present invention to provide a sync state detecting circuit for the disc reproducing apparatus, for enabling a microcomputer to easily process data in the sector unit by generating signals to inform a controller of detected state information relating to a sync signal detected by the sync interpolative circuit.

To achieve the above object of the present invention, there is provided a sync interpolative circuit for a disc reproducing apparatus that includes an effective sync signal generator which receives a window signal and a detected sync signal, reproduced from a disc recorded with data in a sector unit, to generate an effectively-detected sync signal when the detected sync signal exists within a window interval determined by the window signal, receives a window timing signal and an interpolative sync signal to generate an effective interpolation sync signal when the interpolative sync signal precedes the detected sync signal within a window interval determined by the window timing signal, and logically sums the effective interpolation sync signal and effectively-detected sync signal to generate an effective sync signal. Also, a clear signal generator receives the effectively-detected sync signal and the effective interpolation sync signal from the effective sync signal generator, to generate a counter clear signal during the interval corresponding to one data sector, and a counter receives the counter clear signal for generating a window timing rising signal and a window timing falling signal for determining a preset width of the window timing signal. Furthermore, an interpolative sync signal generator generates the window timing signal in response to the window timing rising signal and window timing falling signal, and generates the interpolative sync signal upon the elapse of a predetermined time set from the point in which the window timing rising signal is supplied, and a window signal generator generates a window lock signal in response to the detected sync signal and interpolative sync signal, and logically sums the window lock signal and window timing signal by being supplied with the window timing signal to generate the window signal.

To achieve another object of the present invention, there is provided a sync state detecting circuit which includes a normal sync detector for receiving the window timing signal, interpolative sync signal and detected sync signal from the above-described sync interpolative circuit. The sync state detecting circuit generates a first state signal for representing the state in which the interpolative sync signal corresponds to the detected sync signal. Also, a first abnormal sync detector receives the window signal, window timing before-rising signal, window timing falling signal and detected sync signal to generate a second state signal for representing a state in which there is no detected sync signal within the window interval of the window signal. A second abnormal sync detector receives the window signal, window timing signal, window timing rising signal and detected sync signal to generate a third state signal for representing the state in which the detected sync signal exists outside the window interval of the window signal.

BRIEF DESCRIPTION OF THE DRAWINGS

The above objects and other advantages of the present invention will become more apparent by describing in detail preferred embodiments thereof with reference to the attached drawings in which:

FIG. 1A shows data with respect to one sector;

FIG. 1B shows a clock signal utilized in processing the data;

FIG. 1C shows a detected sync signal obtained from the data of the sector;

FIGS. 12A to 12H and FIGS. 13A to 13J are waveforms in connection with the sync interpolative circuit and the sync state detecting circuit according to the present invention.

DETAILED DESCRIPTION OF THE PREFERRED EMBODIMENTS

Preferred embodiments of the present invention are described below in detail with reference to FIGS. 2 to 13.

Figure 2:
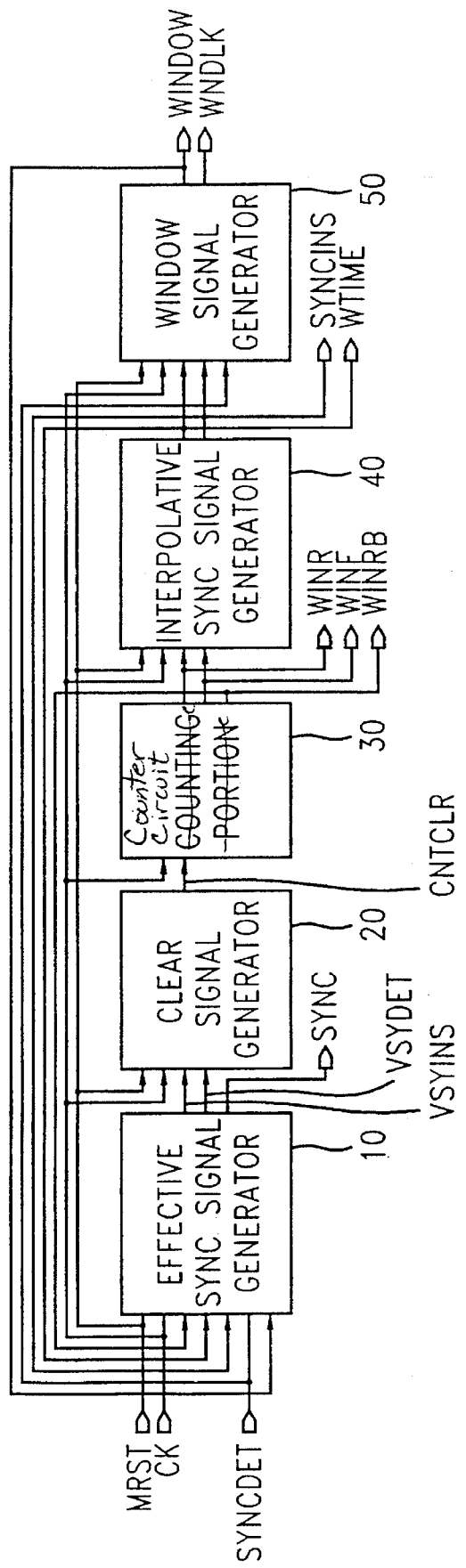
FIG. 2 is a block diagram showing a sync interpolative circuit according to the present invention.

FIG. 2 which is a block diagram showing a sync interpolative circuit of a disc reproducing apparatus according to the present invention, and includes five blocks. An effective sync signal generator 10 being the first block receives Various signals such as a detected sync signal SYNCDET reproduced by a disc, and an interpolative sync signal SYNCINS produced by an interpolative sync signal generator 40. The effective sync signal generator 10 generates an effective sync signal SYNC required for actually reproducing data. An output of the effective sync signal generator 10 is connected to a clear signal generator 20 being the second block. The clear signal generator 20 receives an effective interpolative sync signal VSYINS and an effectively-detected sync signal VSYDET generated by the effective sync signal generator 10. The clear signal generator 20 generates and supplies a counter clear signal CNTCLR to a counter circuit 30. The counter circuit 30, being the third block, has a 2352-digit counter to count the bytes in one sector (2352 bytes). The counter circuit 30 is reset whenever the clear signal CNTCLR is received from the clear signal generator 20. The counter circuit 30 generates a window timing rising signal WINR used for determining a window point, a window timing before-rising signal WINRB preceding the window timing rising signal WINR by one clock pulse, and a window timing falling signal WINF. The interpolative sync signal generator 40, being the fourth block, receives output signals from the counter circuit 30 to produce a window timing signal WTIME, and the interpolative sync signal SYNCINS after a preset time from the rising edge of the window timing signal WTIME. A window signal generator 50, being the last block, compares the timing of the detected sync signal SYNCDET and the interpolative sync signal SYNCINS to produce a window lock signal WNDLK and a window signal WINDOW by means of the window lock signal WNDLK and the window timing signal WTIME.

The operation of the sync interpolative circuit having the above-described structure shown in FIG. 2 is described in detail below with reference to detailed circuit diagrams shown in FIGS. 3 to 7 and the waveforms shown in FIGS. 12A to 12H and 13A to 13J.

Figure 3:
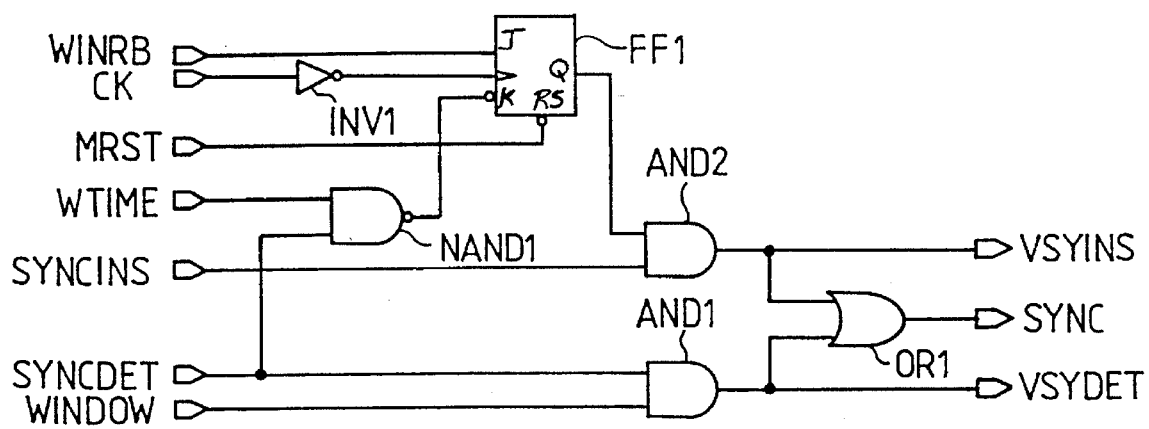
FIG. 3 is a detailed circuit diagram showing the effective sync signal generator of FIG. 2.

FIG. 3 is a detailed circuit diagram of the effective sync signal generator 10 shown in FIG. 2. Here, an inverter INV1 inverts a clock signal CK, shown in FIG. 12A, provided from a sync detecting circuit (not shown) and supplies the inverted clock signal to a JK flip-flop FF1. A NAND gate NAND1 performs the NAND operation on the window timing signal WTIME, shown in FIG. 12F, provided from the interpolative sync signal generator 40, and the detected sync signal SYNCDET. The NAND gate NAND1 thereby provides the result of the NAND operation to an input K of the JK flip-flop FF1. The JK flip-flop FF1 receives the window timing before-rising signal WINRB, shown in FIG. 12C, at an input J thereof, and also receives a master reset signal MRST at a reset terminal RS thereof. The JK flip-flop FF1 which receives the window timing before-rising signal WINRB, shown in FIG. 12C, and a signal from NAND gate NAND1 outputs these signals in accordance with the falling edge of inverted clock signal CK from inverter INV1. An AND gate AND2 receives the output signal from an output Q of the JK flip-flop FF1, and the interpolative sync signal SYNCINS, shown in FIG. 12H, from interpolative sync signal generator 40. AND gate AND2 outputs an effective interpolation sync signal VSYINS having a high level when the interpolative sync signal SYNCINS is generated prior to the detected sync signal SYNCDET while the window timing signal WTIME is at a high level. Detected sync signal SYNCDET and window signal WINDOW from the window signal generator 50 are supplied to AND gate AND1. AND gate AND1 outputs an effectively-detected sync signal VSYDET having a high level when the detected sync signal SYNCDET, shown in FIG. 13C, has a high level while the window signal WINDOW, shown in FIG. 13G, is at a high level. An OR gate OR1 receives and logically sums output signals from AND gates AND1 and AND2, and outputs an effective sync signal SYNC as shown in FIG. 13B. The effective interpolation sync signal VSYINS and effectively-detected sync signal VSYDET output from effective sync signal generator 10 are supplied to clear signal generator 20.

Figure 4:
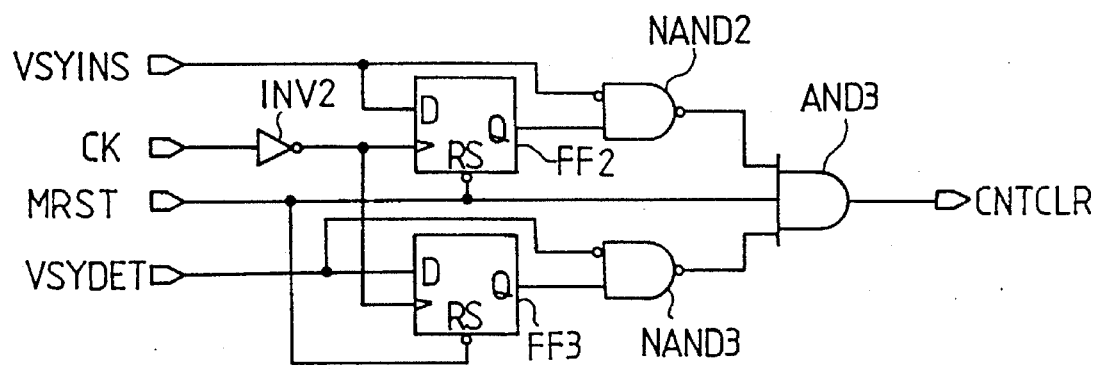
FIG. 4 is a detailed circuit diagram showing the clear signal generator of FIG. 2.

FIG. 4 is a detailed circuit diagram of the clear signal generator 30 shown in FIG. 2. Here, D flip-flops FF2 and FF3 receive the master reset signal MRST at reset terminals RS and clock signal CK inverted by an inverter INV2 at the clock inputs. The D flip-flop FF2 receives the effective interpolation sync signal VSYINS at an input D thereof, in order to output it in accordance with the falling edge of clock signal CK. The D flip-flop FF3 receives the effectively-detected sync signal VSYDET at an input D thereof, in order to output it in accordance with the falling edge of clock signal CK. A NAND gate NAND2 receives the effective interpolation sync signal VSYINS and the output signal of D flip-flop FF2 in order to perform the NAND operation, thereby providing the result. A NAND gate NAND3 receives the effectively-detected sync signal VSYDET and an output signal of the D flip-flop FF3 to perform the NAND operation, thereby providing the result. An AND gate AND3 logically combines the master reset signal MRST, effective interpolation sync signal VSYINS and effectively-detected sync signal VSYDET by performing the AND operation, in order to produce the counter clear signal CNTCLR. The counter clear signal CNTCLR resets counter circuit 30 whenever the counter circuit 30 counts 2352 clock signals CK, and has a low level value for half of one period of the clock signal.

Figure 5:
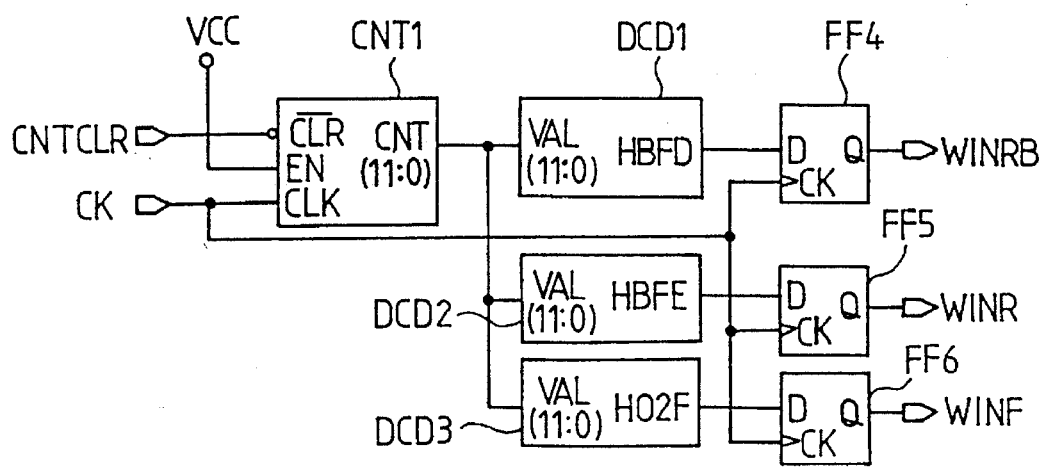
FIG. 5 is a detailed circuit diagram showing the counter circuit of FIG. 2.

FIG. 5 is a detailed circuit diagram of the counter circuit 30 shown in FIG. 2. Here, a counter CNT1 counts the clock signal CK and is reset when the counter clear signal CNT-CLR output from the clear signal generator 20 transitions to a low level. Decoders DCD1, DCD2 and DCD3, connected to the output of the counter CNT1, respectively, output a high level signal when the output signal from counter CNT1 is detected to be equal to an initial value stored in the decoder. The first decoder DCD1 is initialized to a value of 2301. Similarly, the second decoder DCD2 is initialized to a value of 2302, and the third decoder DCD3 is initialized to a value of 47. The initial values 2301, 2302 and 47 of the decoders DCD1 to DCD3 are determined in view of the window timing signal WTIME. In this embodiment, the interval in which the window timing signal WTIME is set at a high level corresponds to the interval from the −48th byte to the +48th byte, wherein the interpolative sync signal SYNCINS is used as a reference, such that it is centered in the interval of the window timing signal WTIME. The output signals from the decoders DCD1 to DCD3 are supplied to the D inputs of flip-flops FF4, FF5 and FF6, respectively. The D flip-flops FF4 to FF6 serve to stabilize the output signals of decoders DCD1 to DCD3 which can become unstable when the output signal of the counter CNT1 is changed. The D flip-flop FF4 supplies the window timing before-rising signal WINRB (refer to FIG. 12C) formed by the decoder DCD1. Similarly, D flip-flop FF5 supplies the window timing rising signal WINR (refer to FIG. 12D) for determining the rising point (i.e., −48) of the window timing signal WTIME, and D flip-flop FF6 supplies the window timing falling signal WINF (refer to FIG. 12E) for determining the falling point (e.g., +48) of the window timing signal WTIME. The signals WINRB, WINR and WINF formed in counter circuit 30 are supplied to the interpolative sync signal generator 40.

Figure 6:
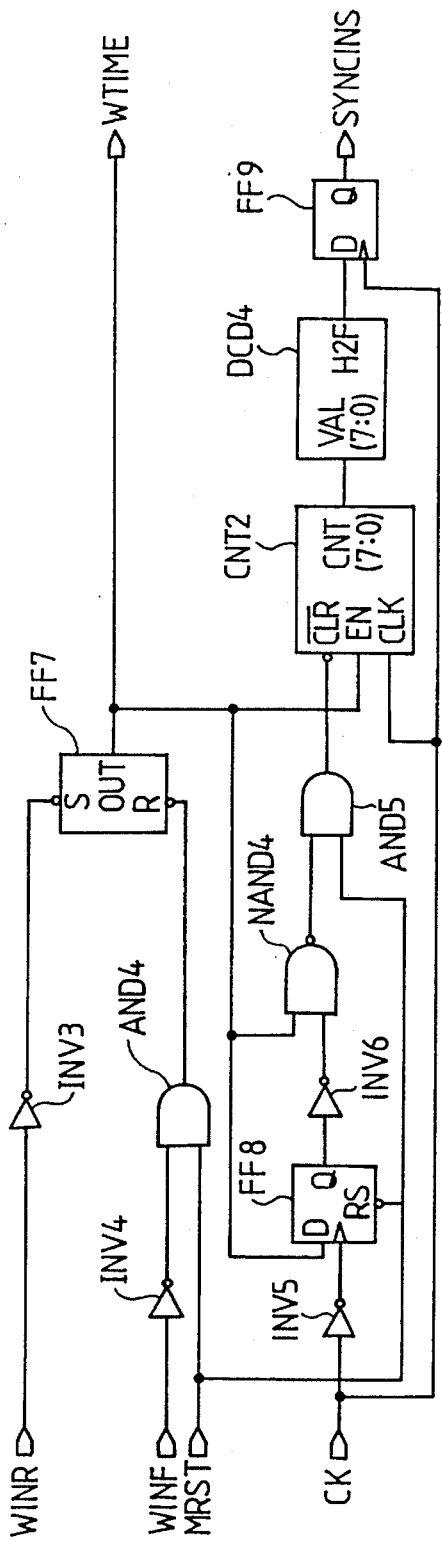
FIG. 6 is a detailed circuit diagram of the interpolative sync signal generator of FIG. 2.

FIG. 6 is a detailed circuit diagram of the interpolative sync signal generator 40 shown in FIG. 2. The window timing rising signal WINR (refer to FIG. 12D) is inverted by an inverter INV3, the output of which is supplied to a set terminal S of an RS flip-flop FF7. An AND gate AND4 logically combines the output signal of an inverter INV4, which inverts the window timing falling signal WINF (refer to FIG. 12E), and the master reset signal MRST, and outputs the resultant signal to a reset terminal R of RS flip-flop FF7. The RS flip-flop FF7 outputs the window timing signal WTIME (refer to FIG. 12F) having a high level at the moment the window timing rising signal WINR transitions to a high level, and which has a low level at the moment the window timing falling signal WINF transitions to a high level. A D flip-flop FF8 synchronizes the window timing signal WTIME output from RS flip-flop FF7 and supplied to an input D thereof, with an inverted clock signal, output from an inverter INV5 which inverts the clock signal CK. The D flip-flop FF8 is reset by a master reset signal MRST input to a reset terminal RS of D flip-flop FF8. The D flip-flop FF8 thereby provides the result via an output Q thereof, which is then inverted by an inverter INV6 and supplied to a NAND gate NAND4. The NAND gate NAND4 performs the NAND operation upon the output signals of the RS flip-flop FF7 and the inverter INV6, thereby supplying the result to an AND gate AND5. The AND gate AND5 logically combines the master reset signal MRST and an output signal of the NAND gate NAND4 to provide the result to a clear terminal CLR of a counter CNT2. The signal output from AND gate AND5 is in low level state at the moment the window timing signal WTIME transitions to a high level. The counter CNT2 receives the signal WTIME output from RS flip-flop FF7 at an enable terminal EN, and clock signal CK at a clock terminal CLK, respectively, in order to count the clock signal CK while the window timing signal WTIME is at a high level. A fourth decoder DCD4 supplies a high level signal when an 8-bit count signal (refer to FIG. 12G) output from counter CNT2 indicates a count value of 48. This output signal is the interpolative sync signal SYNCINS (refer to FIG. 12H) which is stabilized by passing through a D flip-flop FF9.

Figure 7:
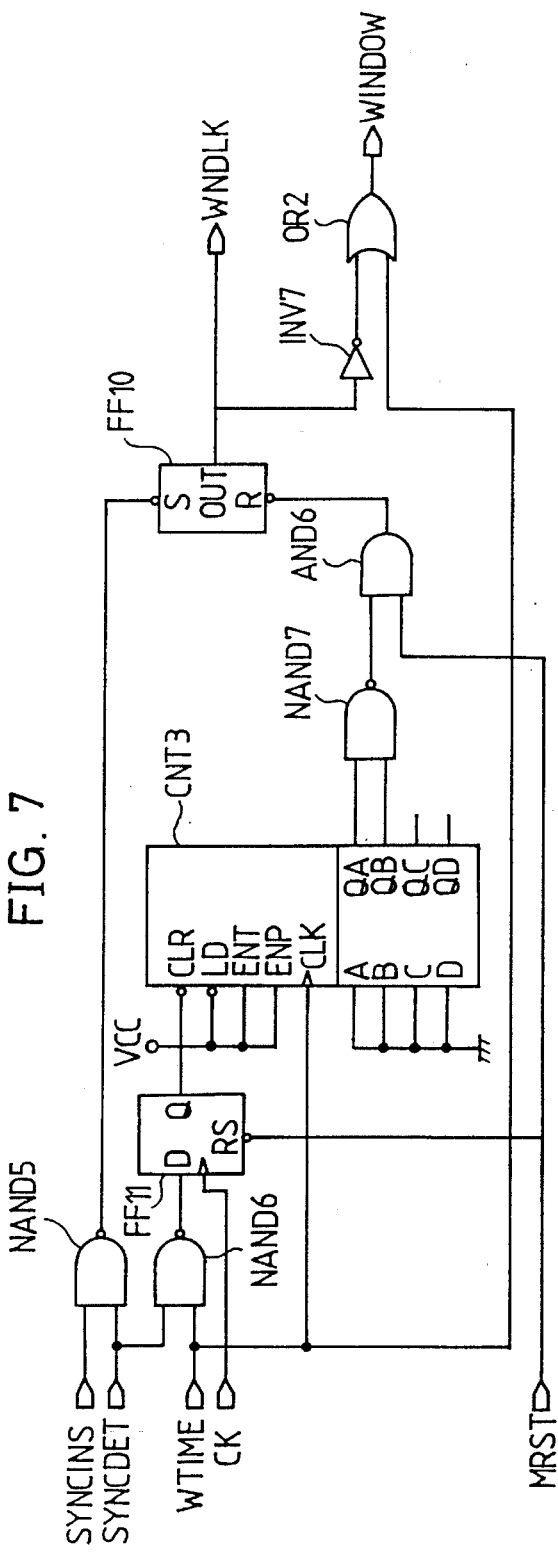
FIG. 7 is a detailed circuit diagram showing the window signal generator of FIG. 2.

FIG. 7 is a detailed circuit diagram of the window signal generator 50 shown in FIG. 2. A NAND gate NAND5 performs the NAND operation upon the interpolative sync signal SYNCINS (refer to FIG. 13D) and the detected sync signal SYNCDET (refer to FIG. 13C) and supplies the result to a set terminal S of an RS flip-flop FF10. The RS flop-flop FF10 generates the window lock signal WNDLK (refer to FIG. 13F) which has a high level when both the interpolative sync signal SYNCINS and the detected sync signal SYNCDET are in high level state. A NAND gate NAND6 performs the NAND operation upon the detected sync signal SYNCDET and window timing signal WTIME and supplies the result to the D input of a D flip-flop FF11. The NAND gate NAND6 supplies a low level signal to the D flip-flop FF11 when the detected sync signal SYNCDET transitions to high level while the window timing signal WTIME is in a high level state.

An output signal of the D flip-flop FF11 is supplied to a clear terminal CLR of a counter CNT3. The counter CNT3 counts the number of window timing signals WTIME, and is cleared by an output Q of the D flip-flop FF11. The counter CNT3 produces a number indicating how many window timing signal WTIME intervals, in which the window timing signal WTIME is at a high level, are encountered in which no sync signal SYNCDET having a high level state, is detected. This number is indicated by the two output bits QA and QB of counter CNT3. The two bits QA and QB of the counter CNT3 are respectively connected to an input of a NAND gate NAND7. The NAND gate NAND7 supplies a low level signal when the value of an output signal of the counter CNT3 is "$11_2$" (i.e., the decimal number of three). An AND gate AND6 logically combines the output signal of NAND gate NAND7 and master reset signal MRST, and supplies the result to a reset terminal R of the RS flip-flop FF10. Consequently, if two successive window timing signals WTIME are detected in which no detected sync signal SYNCDET having a high level is detected, then the flip-flop FF10 outputs the window lock signal WNDLK (refer to FIG. 13G) having a low level state in accordance with a low level signal from AND gate AND6. Otherwise, the window lock signal WNDLK is continuously held at a high level. An OR gate OR2 logically sums the window lock signal WNDLK inverted by an inverter INV7 and the window timing signal WTIME, and outputs the result as the window signal WINDOW. The window signal WINDOW generated by OR gate OR2 has the same level state as the window timing signal WTIME when the window lock signal WNDLK from the RS flip-flop FF10 is in a high level state, and the same level state as the window lock signal WNDLK when the window lock signal WNDLK is in a low level state.

Figure 8:
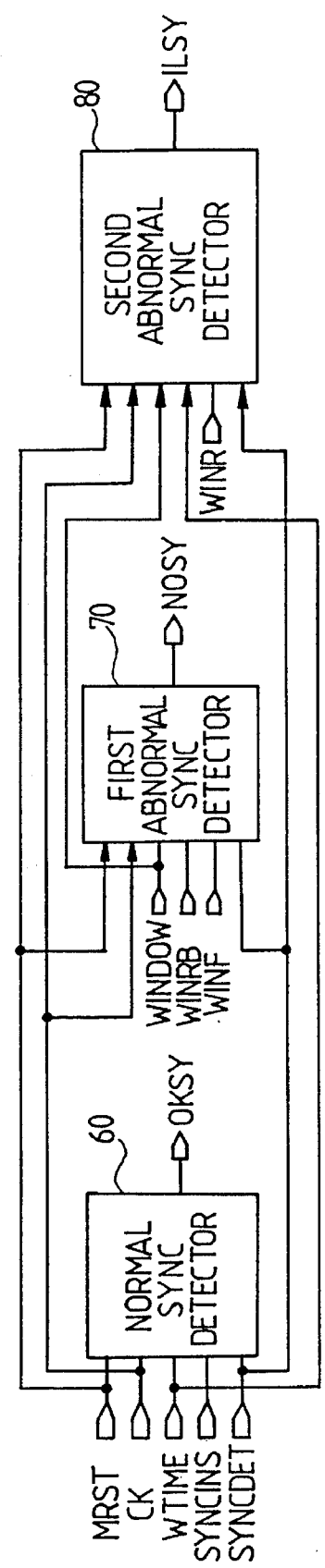
FIG. 8 is a block diagram showing a sync state detecting circuit according to the present invention.

FIG. 8 is a block diagram showing the overall construction of a sync state detecting circuit according to the present invention. The sync state detecting circuit according to the present invention includes a normal sync detector 60, a first abnormal sync detector 70 and a second abnormal sync detector 80, and indicates a sync state by means of signals produced from the circuit, as shown in FIG. 2.

The normal sync detector 60 generates a first state signal OKSY for indicating that the interpolative sync signal SYNCINS (refer to FIG. 13D) and the detected sync signal SYNCDET (refer to FIG. 13C) are detected as simultaneously having a high level.

The first abnormal sync detector 70 generates a second state signal NOSY which, when active, indicates that the current effective sync signal SYNC has no corresponding detected sync signal SYNCDET, having a high level, occurring within the interval in which the window signal WINDOW is at a high level state.

The second abnormal sync detector 80 generates a third state signal ILSY for indicating that the detected sync signal SYNCDET exists outside of the high level interval of the window signal WINDOW.

The operation of the sync state detecting circuit having the above-described construction is described below in detail, with reference to detailed circuit diagrams FIGS. 9 to 11 and the waveforms shown in FIGS. 13A to 13J.

Figure 9:
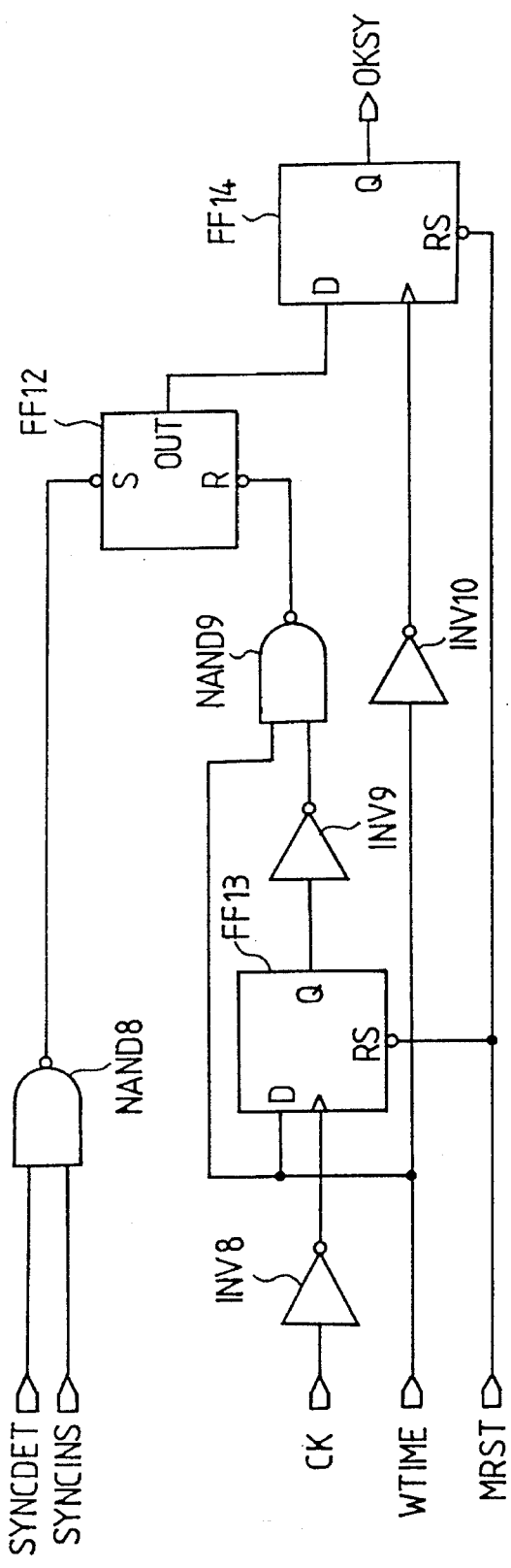
FIG. 9 is a detailed circuit diagram showing the normal sync detector of FIG. 8.

FIG. 9 is a detailed circuit diagram of the normal sync detector 60 shown in FIG. 8. A NAND gate NAND8 performs the NAND operation upon the detected sync signal SYNCDET (refer to FIG. 13C) and the interpolative sync signal SYNCINS (refer to FIG. 13D) and provides the result to the set terminal S of an RS flip-flop FF12. The RS flip-flop FF12 outputs a high level signal to the D input terminal of D flip-flop FF14 when both the interpolative sync signal SYNCINS and the detected sync signal SYNCDET have a high level. The D flip-flop FF14 synchronizes the input signal with the window timing signal WTIME inverted by an inverter INV10 to provide the resultant signal OKSY. On the other hand, an inverter INV8 inverts the clock signal CK to supply the inverted clock signal to a clock terminal of a D flip-flop FF13. The D flip-flop FF13 receives master reset signal MRST at a reset terminal RS thereof, and receives window timing signal WTIME (refer to FIG. 13E) at an input D thereof to synchronize it at the falling edge of clock signal CK, thereby supplying the result to an inverter INV9. A NAND gate NAND9 performs the NAND operation upon the signal inverted by the inverter INV9 and the window timing signal WTIME to supply the result to the reset terminal R of the RS flip-flop FF12. An output signal of the NAND gate NAND9 transitions to a low level signal at the rising edge of the window timing signal WTIME. The RS flip-flop FF12 supplies a low level signal through an output OUT thereof, upon receipt of the low level signal from the NAND gate NAND9. The output signal of the RS flip-flop FF12 is supplied to the input D of the D flip-flop FF14. The D flip-flop FF14 receives an output signal of an inverter INV10 for inverting the window timing signal WTIME to produce the first state signal OKSY (refer to FIG. 13H). The first state signal OKSY, produced by being synchronized at the falling edge of the window timing signal WTIME, has a high level when both interpolative sync signal SYNCINS and detected sync signal SYNCDET are in a high level state. Here, the first state signal OKSY represents scenario that the detected sync signal SYNCDET (refer to FIG. 13C) is generated after the effective sync signal SYNC by one preceding sector or after the interpolative sync signal SYNCINS by 1252 bytes.

Figure 10:
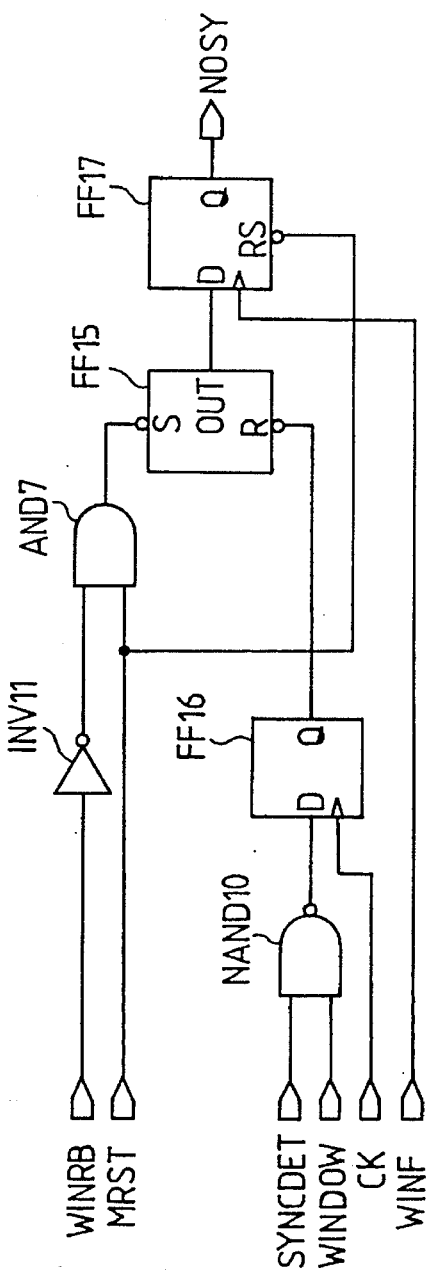
FIG. 10 is a detailed circuit diagram showing the first abnormal sync detector of FIG. 8.

FIG. 10 is a detailed circuit diagram of the first abnormal sync detector 70 shown in FIG. 8. An AND gate AND7 logically combines an output signal of an inverter INV11, which inverts the window timing before-rising signal WINRB, and the master reset signal MRST to supply the result to a set terminal S of an RS flip-flop FF15. The RS flip-flop FF15 outputs a high level signal except in the case where the master reset signal has a high level while the window timing before-rising signal WINRB has a low level.

A NAND gate NAND10 performs the NAND operation upon the detected sync signal SYNCDET (refer to FIG. 13C) and the window signal WINDOW (refer to FIG. 13G) to supply the result to an input D of a D flip-flop FF16. The D flip-flop FF16 supplies a low level signal to a reset terminal R of the RS flip-flop FF15 when the detected sync signal SYNCDET of the high level state exists within the window timing signal WTIME of high level state. The RS flip-flop FF15 supplies a low level signal via output terminal OUT thereof, upon the receipt of the low level signal from the reset terminal R thereof. A D flip-flop FF17 receives the window timing falling signal WINF at a clock terminal CK thereof, and the output signal of flip-flop FF15 to an input D thereof. The output signal of flip-flop FF15 is synchronized with the window timing falling signal WINF to supply the second state signal NOSY (refer to FIG. 13I) having a low level state when the detected sync signal WINDET of low level state exists within the interval of the window signal WINDOW having a high level, or the second state signal NOSY has a high level state when the detected sync signal WINDET having a low level state exists in the above-stated interval.

Figure 11:
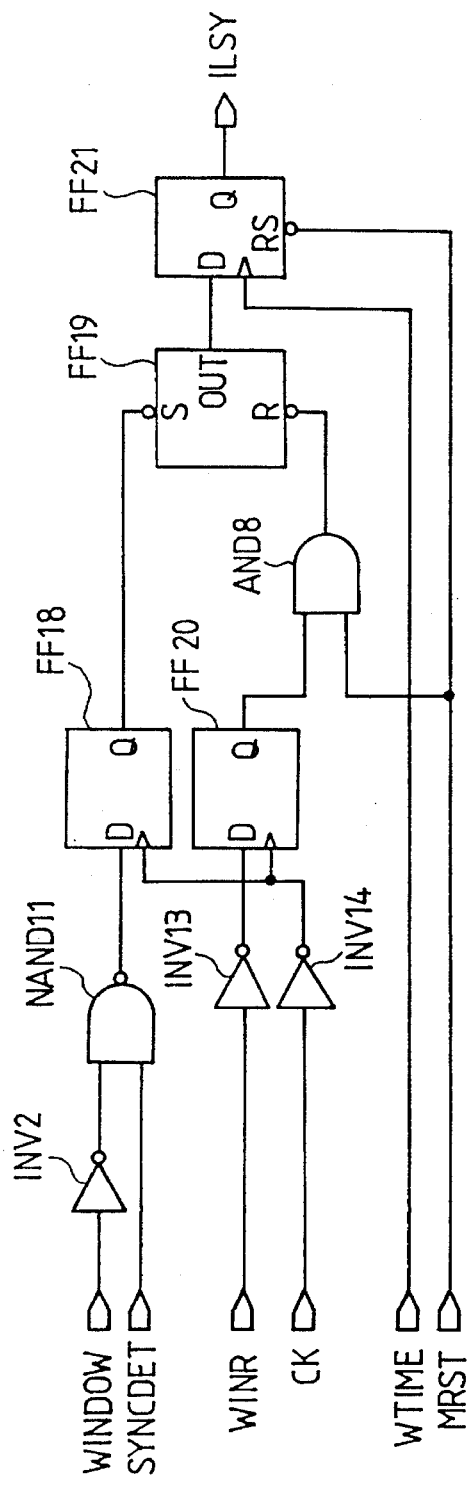
FIG. 11 is a detailed circuit diagram showing the second abnormal sync detector of FIG. 8.

FIG. 11 is a detailed circuit diagram of the second abnormal sync detector 80 shown in FIG. 8. A NAND gate NAND11 performs the NAND operation upon the detected sync signal SYNCDET and an output signal of an inverter INV12, which inverts the window signal WINDOW, supplying the result to the D input terminal of a D flip-flop FF18. The D flip-flop FF18 is operated in accordance with an output signal of an inverter INV14 which inverts the clock signal CK. The D flip-flop FF18 supplies a low level output signal to the set terminal S of an RS flip-fop FF19 when the detected sync signal SYNCDET, having a high level state, exists within the interval of the window signal WINDOW having a low level state. The RS flip-flop FF19 supplies a high level signal to a D flip-flop FF21 via an output terminal OUT thereof, upon receipt of the low level signal to the set terminal S thereof. The input to D flip-flop FF21 is synchronized with the window timing signal WTIME supplied as the clock signal, in order to provide the third state signal ILSY (refer to FIG. 13J) having a high level state.

Meantime, a D flip-flop FF20 receives the window timing rising signal WINR inverted by an inverter INV13 at an input D thereof. The clock signal CK is inverted by an inverter IN14 and supplied to the clock terminal of D flip-flop FF20, which then synchronizes the input with the clock signal. The D flip-flop FF20 supplies a low level signal to an AND gate AND8 when the window timing rising signal WINR has a high level state upon the falling edge of the clock signal CK. The AND gate AND8 logically combines the master reset signal MRST and the output signal of the D flip-flop FF20, and supplies the result to RS flip-flop FF19. The RS flip-flop FF19 supplies a low level signal to an input D of the D flip-flop FF21 when the output signal of the AND gate AND8 has a low level state. The D flip-flop FF21 provides the third state signal ILSY having low level state in accordance with the window timing signal WTIME supplied as the clock signal. If the detected sync signal SYNCDET has a high level state during the interval in which the window signal WINDOW is a low level, the third state signal ILSY has a high level state; whereas, if the detected sync signal SYNCDET has a low level state during interval when the window signal WINDOW is a high level, the third state signal ILSY has low level state.

According to the present invention as described above, when a sync signal detected from a disc is changed due to an error or when it is not detected, an interpolative sync signal is generated to accurately reproduce data. Also, a detected state of the sync signal is determined to inform a controller to allow it to easily process the data in the sector unit.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A sync interpolative circuit for generating a sync signal employed to reproduce data corresponding to a sector unit read out from a disc having data stored in the sector unit, comprising:

an effective sync signal generator for receiving a window signal and a detected sync signal reproduced from said disc to generate an effectively-detected sync signal when said detected sync signal is present during a window interval determined by said window signal, receiving a window timing signal and an interpolative sync signal to generate an effective interpolation sync signal when said interpolative sync signal precedes said detected sync signal within the window interval, and logically summing said effective interpolation sync signal and said effectively-detected sync signal to generate an effective sync signal;

a clear signal generator for receiving said effectively-detected sync signal and said effective interpolation sync signal from said effective sync signal generator to generate a counter clear signal after an interval of time elapses corresponding to one sector unit;

a counting unit means for receiving said counter clear signal to generate a window timing rising signal and a window timing falling signal for determining a preset width of said window timing signal;

an interpolative sync signal generator for generating said window timing signal in response to said window timing rising signal and window timing falling signal, and generating said interpolative sync signal upon elapse of a predetermined time set from an activation of said window timing rising signal; and a window signal generator for generating a window lock signal in response to said detected sync signal and said interpolative sync signal, and generating said window signal by logically summing said window lock signal and said window timing signal.

2. The sync interpolative circuit as claimed in claim 1, wherein said effective sync signal generator comprises:

a first AND gate for logically combining said detected sync signal and said window signal to output said effectively-detected sync signal;

a first NAND gate for performing a NAND operation upon said window timing signal and said detected sync signal;

a JK flip-flop, receiving a window timing before-rising signal preceding said window timing rising signal by one pulse of a clock signal at a J input, and an output signal of said first NAND gate at an inverted K input, for synchronizing the input signals to the J and K inputs at a falling edge of a clock signal;

a second AND gate for logically combining an output signal of said JK flip-flop and said interpolative sync signal to output said effective interpolation sync signal; and a first OR gate for logically summing the output signals from said first and second AND gates to output said effective sync signal.

3. The sync interpolative circuit as claimed in claim 1, wherein said clear signal generator comprises:

a first D flip-flop for receiving and synchronizing said effective interpolation sync signal at a falling edge of a clock signal;

a first NAND gate for performing a NAND operation upon an output signal of said first D flip-flop and an inverted effective interpolation sync signal;

a second D flip-flop for receiving and synchronizing said effectively-detected sync signal at the falling edge of said clock signal;

a second NAND gate for performing the NAND operation upon an output signal of said second D flip-flop and an inverted effectively-detected sync signal; and an AND gate for logically combining the output signals of said first and second NAND gates to generate said counter clear signal.

4. The sync interpolative circuit as claimed in claim 1, wherein said counting unit comprises:

a first counter for counting a clock signal, being reset by said counter clear signal;

a first decoder for detecting if the value of an output signal of said first counter reaches a first preset value;

a second decoder for detecting if the value of said output signal of said first counter reaches a second preset value; and a third decoder for detecting if the value of said output signal of said first counter reaches a third preset value.

5. The sync interpolative circuit as claimed in claim 4, wherein each of said preset values is a predetermined value, wherein a generating point of said interpolative sync signal is centered within said width of said window timing signal.

6. The sync interpolative circuit as claimed in claim 4, wherein said interpolative sync signal generator comprises:

a first AND gate for logically combining an inverted window timing falling signal and a master reset signal;

a first RS flip-flop set by an inverted window timing rising signal having a low level, and reset by a low level signal output from said first AND gate, for generating said window timing signal;

a rising edge detector receiving said window timing signal, said master reset signal and said clock signal, for detecting a rising edge of said window timing signal;

a second counter initialized by a low level signal from said rising edge detector, for counting said clock signal while being enabled by said window timing signal; and a fourth decoder for detecting if the value of an output signal of said second counter reaches a fourth preset value.

7. The sync interpolative circuit as claimed in claim 6, wherein said rising edge detector comprises:

a first D flip-flop for synchronizing said window timing signal at a falling edge of said clock signal;

a first inverter for inverting an output signal of said first D flip-flop;

a first NAND gate for performing a NAND operation upon said window timing signal and an output signal of said first inverter; and a second AND gate for logically combining an output signal of said first NAND gate and said master reset signal.

8. The sync interpolative circuit as claimed in claim 7, wherein said fourth decoder generates an output signal at the rising edge of said window timing signal, when said second counter reaches a value of 48.

9. The sync interpolative circuit as claimed in claim 7, wherein said window signal generator comprises:
- a second NAND gate for performing the NAND operation upon said interpolative sync signal and said detected sync signal;
- a third NAND gate for performing the NAND operation upon said detected sync signal and said window timing signal; a second D flip-flop for synchronizing an output signal of said third NAND gate with a rising edge of said clock signal and outputting the result;
- a third counter initialized by a low level output signal of said second D flip-flop for counting said clock signal and providing two bit-signals;
- a fourth NAND gate for detecting a fifth preset value in an output signal of said third counter and thereupon providing a low level signal;
- a second RS flip-flop set by a low level signal from said second NAND gate, and reset by said low level signal from said fourth NAND gate for generating said window lock signal;
- a second inverter for inverting said window lock signal; and
- a first OR gate for logically summing an output signal of said second inverter and said window timing signal and generating said window signal.

10. A sync state detecting circuit in an apparatus for generating a sync signal, to reproduce data in a sector unit read out from a disc having tracks, comprising:
- an effective sync signal generator for receiving a detected sync signal reproduced from said disc and a window signal from a window signal generator to generate an effectively-detected sync signal when said detected sync signal exists within a first window interval determined by said window signal, receiving a window timing signal and an interpolative sync signal to generate an effective interpolation sync signal when said interpolative sync signal precedes said detected sync signal within a second window interval determined by said window timing signal, and supplying said effective interpolation sync signal and said effectively-detected sync signal as an effective sync signal;
- a clear signal generator for receiving said effectively-detected sync signal and said effective interpolation sync signal from said effective sync signal generator to generate a counter clear signal in an interval corresponding to one sector unit;
- a counting unit means for receiving said counter clear signal to generate a window timing before-rising signal, a window timing rising signal and a window timing falling signal both for determining said second window interval of said window timing signal;
- an interpolative sync signal generator for generating said window timing signal in response to said window timing rising signal and window timing falling signal, and generating said interpolative sync signal upon elapse of a predetermined time set by said window timing rising signal;
- said window signal generator for generating a window lock signal by comparing timing of said detected sync signal and said interpolative sync signal, and generating said window signal by logically summing said window lock signal and said window timing signal; and
- a normal sync detector for receiving said window timing signal, said interpolative sync signal and said detected sync signal to generate a first state signal that represents a state in which said interpolative sync signal corresponds to said detected sync signal.

11. The sync state detecting circuit as claimed in claim 10, wherein said normal sync detector comprises:
- a first NAND gate for performing the NAND operation upon said interpolative sync signal and said detected sync signal;
- a rising edge detector for receiving said window timing signal, a master reset signal and a clock signal to detect a rising edge of said window timing signal;
- a first RS flip-flop set by a low level signal from said first NAND gate, and reset by a low level signal from said rising edge detector; and
- a first D flip-flop for synchronizing an output signal of said first RS flip-flop with said window timing signal having a low level, and providing said first state signal.

12. The sync state detecting circuit as claimed in claim 11, wherein said rising edge detector comprises:
- a second D flip-flop for synchronizing said window timing signal at a falling edge of said clock signal;
- a first inverter for inverting an output signal of said second D flip-flop; and
- a second NAND gate for performing the NAND operation upon said window timing signal and an output signal of said first inverter.

13. The sync state detecting circuit as claimed in claim 10 further comprising a first abnormal sync detector which receives said window signal, said window timing before-rising signal, said window timing falling signal and said detected sync signal for generating a second state signal for representing a state where no detected sync signal is present within said first window interval of said window signal.

14. The sync state detecting circuit as claimed in claim 13, wherein said first abnormal sync detector comprises:
- a first AND gate for logically combining an inverted window timing before-rising signal and said master reset signal;
- a first NAND gate for performing the NAND operation upon said detected sync signal and said window signal;
- a first D flip-flop for synchronizing an output signal of said first NAND gate with the falling edge of said clock signal;
- a first RS flip-flop set by a low-level signal from said first AND gate, and reset by a low level signal from said first D flip-flop; and
- a second D flip-flop for synchronizing an output signal of said first RS flip-flop with the rising edge of said window timing falling edge signal.

15. The sync state detecting circuit as claimed in claim 10 further comprising a second abnormal sync detector which receives said window signal, window timing signal, said window timing rising signal and said detected sync signal for generating a third state signal which represents a state in which said detected sync signal exists outside said first window interval of said window signal.

16. The sync state detecting circuit as claimed in claim 15, wherein said second abnormal sync detector comprises:
- a second NAND gate for performing the NAND operation upon said detected sync signal and an inverted window signal;
- a third D flip-flop for synchronizing an output signal of said second NAND gate at the falling edge of said clock signal;

a fourth D flip-flop for synchronizing an inverted window timing rising signal at the falling edge of said clock signal;

a second AND gate for logically producing an output signal of said fourth D flip-flop and said master reset signal;

a second RS flip-flop set by a low level signal from said third D flip-flop and reset by a low level signal from said second AND gate; and a fifth D flip-flop for synchronizing an output signal of said second RS flip-flop at the rising edge of said window timing signal, and generating a third state signal.

17. The sync state detecting circuit as claimed in claim 10 further comprising a second abnormal sync detector which receives said window signal, window timing signal, said window timing rising signal and said detected sync signal for generating a third state signal which represents a state in which said detected sync signal exists outside said first window interval of said window signal.

18. The sync state detecting circuit as claimed in claim 17, wherein said second abnormal sync detector comprises:

a NAND gate for performing the NAND operation upon said detected sync signal and an inverted window signal;

a first D flip-flop for synchronizing an output signal of said NAND gate at a falling edge of a clock signal;

a second D flip-flop for synchronizing an inverted window timing rising signal at the falling edge of said clock signal;

an AND gate for logically combining an output signal of said second D flip-flop and a master reset signal;

a RS flip-flop set by a low level signal from said first D flip-flop, and reset by a low level signal from said AND gate; and a third D flip-flop for synchronizing an output signal of said RS flip-flop at the rising edge of said window timing signal, and generating a third state signal.

* * * * *